(12) United States Patent
Krumm et al.

(10) Patent No.: US 8,874,361 B2
(45) Date of Patent: Oct. 28, 2014

(54) VEHICLE ROUTE REPRESENTATION CREATION

(75) Inventors: John Krumm, Redmond, WA (US); Lili Cao, Santa Barbara, CA (US)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 12/472,464

(22) Filed: May 27, 2009

(65) Prior Publication Data

US 2010/0305850 A1 Dec. 2, 2010

(51) Int. Cl.
G01C 21/30 (2006.01)
G01C 21/32 (2006.01)

(52) U.S. Cl.
CPC .................................... *G01C 21/32* (2013.01)
USPC ........... 701/400; 701/408; 701/410; 701/411; 701/412; 701/416; 701/417; 701/420; 701/422; 701/468; 701/533; 701/482; 340/990; 340/995.1; 340/995.19; 340/988; 340/936

(58) Field of Classification Search
USPC ......................................................... 701/208
See application file for complete search history.

(56) References Cited

U.S. PATENT DOCUMENTS

| | | | | |
|---|---|---|---|---|
| 4,906,940 | A * | 3/1990 | Greene et al. | 382/100 |
| 7,158,912 | B2 * | 1/2007 | Vock et al. | 702/142 |
| 7,516,039 | B2 * | 4/2009 | McKitterick | 702/155 |
| 2004/0225437 | A1 * | 11/2004 | Endo et al. | 701/209 |
| 2006/0155464 | A1 | 7/2006 | Smartt | |
| 2007/0129892 | A1 | 6/2007 | Smartt | |
| 2008/0004789 | A1 * | 1/2008 | Horvitz et al. | 701/117 |

OTHER PUBLICATIONS

Garner, Gavin Thomas. Mechatronics as a technological basis for an innovative learning environment in engineering. University of Virginia, UMI Dissertations Publishing, 2009.*

Bruntrup et al. "Incremental Map Generation with GPS Traces", Proceedings of the 8th Internation IEEE Conference on Intellegent Transportation Systems, Sep. 13-16, 2005, Vienna, Austria, http://ieeexplore.ieee.org/xpl/freeabs_all.jsp?arnumber=1520084.

Chang et al., "Progressive Lane Analysis in the Digital Map using Fuzzy Method", http://www.atlantis-press.com/php/download_paper.php?id=293.

Schroedl et al., "Mining GPS Traces for Map Refinement", Data Mining and Knowledge Discovery 9, 2004, 59-87 http://www.springerlink.com/content/n1x73g22q35u1163/.

Edelkamp et al., "Route Planning and Map Interference with Global Positioning Traces", http://springerlink.com/content.vy7u5f0almpvh46n/.

Rogers et al., "Mining GPS Data to Augment Road Models", http://citeseerx.ist.psu.edu/viewdoc/download?doi=10.1.1.52.8647&rep=rep1&type=pdf.

(Continued)

*Primary Examiner* — Ryan Zeender
*Assistant Examiner* — Fawaad Haider
(74) *Attorney, Agent, or Firm* — Dan Choi; Judy Yee; Micky Minhas

(57) ABSTRACT

Techniques and systems are disclosed that provide for creating an accurate representation of a roadway network, such as for planning vehicle travel routes. Positioning data is obtained, such as GPS data points from a plurality of vehicles, which mark traces of vehicular travel. A location of a trace is clarified using adjustment forces that are related to the traces, for example, to form coherent groups of traces. From these groups of clarified traces, a graph line is created by merging the traces.

20 Claims, 9 Drawing Sheets

(56) References Cited

OTHER PUBLICATIONS

Davies et al., "Scalable, Disributed, Real-Time Map Generation", IEEE Pervasive Computing: Mobile and Ubiquitous Systems, vol. 5, No. 4, Oct.-Dec. 2006 http://www.cl.cam.ac.uk/~jjd27/ieee-pervasive-oct06-047-054.pdf.

Worrall et al., "Automated Process for Generating Digitised Maps through GPS Data Compression" http://www.araa.asn.au/acra/acra2007/papers/paper74final.pdf.

Davies, Jonathan, "Distributed, Vehicular Computation for Map Generation", University of Cambridge Computer Laboratory http://www.cl.cam.ac.uk/research/dtg/publications/public/jjd127/davies-aag07.pdf.

"OpenStreetMap: The Free Wiki World Map", Jul. 2004, reprinted from the Internet at: http://planet.openstreetmap.org/, 2 pgs.

"Computational Geometry-Algorithms and Applications", Mark De Berg, Marc Van Kreveld, Mark Overmars and Otfried Schwarzkopf, Second, Revised Edition, Springer-Verlag, 2000, 357 pgs.

* cited by examiner

VEHICLE ROUTE REPRESENTATION CREATION

BACKGROUND

Vehicle route planning typically relies on representation of roadway networks. Roadway networks can be represented electronically, such as digital maps displayed on computing devices. User often access digital maps on computers, smart phones, and vehicle computer navigation systems, for example, to plan travel routes and/or identify a present location of their vehicle. Accuracy of maps, such as electronic maps, is needed for proper route planning, and roadways and other vehicular travel routes can often change due to construction, new roads, or other conditions, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A representation of a roadway network should be accurate in terms of the connectivity and directionality of road segments. Where digital maps are used in computer-based route planning, for example, accuracy is important for basic route planning algorithms that are often used to identify routes. Further, a representation should also be geometrically accurate in order to display routes and give clear instructions about how far to drive between turns, such as in vehicle navigation systems.

Traditionally, digital representations of the road network have been derived from data that comes from specialized vehicles roaming a road network, operated by skilled data gathers. This type of data collection can be expensive and is limited by a number of specialized vehicles utilized. Another current approach to building a representation of the road network utilizes a combination of global positioning satellite (GPS) traces (e.g., collections of data points connected by edges) and satellite images as input to a manually edited road map. While this approach has more scalability potential than prior methods, it still depends on manual editing.

Techniques and systems are disclosed for creating an accurate representation of a roadway network positioning data using non-traditional mapping vehicles. For example, public vehicles, taxis, delivery vehicles and other may be fitted with GPS tracking units to collect traces as the vehicles travel their typical routes.

In one embodiment, raw positioning data (e.g., GPS data points) can be collected, such as from a plurality of vehicles, which mark traces of vehicular travel. In this embodiment, a location of the traces can be clarified, such as into more coherent groups, using adjustment forces that are related to the traces. From these groups of clarified traces, a graph line can be created by merging the traces, for example, into graph of nodes and edges representing the road network. In this embodiment, the graph may be suitable for planning vehicle travel routes.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
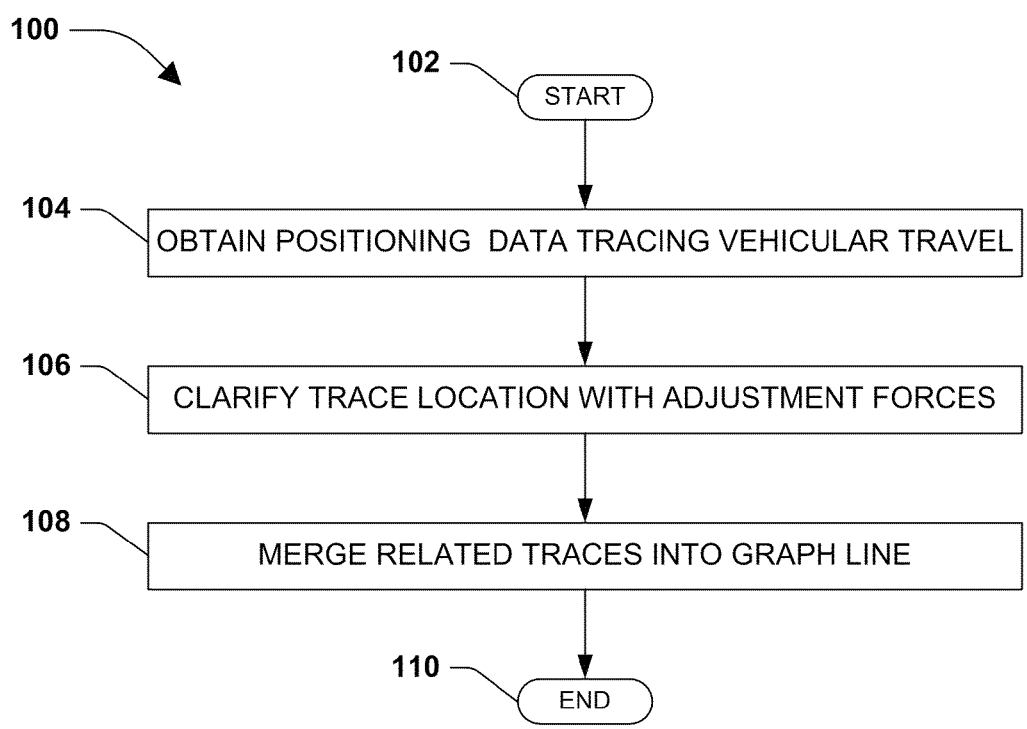
FIG. 1 is a flow chart diagram of an exemplary method for generating graph-line maps of vehicular routes.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that allows for creation of a digital vehicular travel route, for example, such as an electronic map that can be used to determine travel routes for automobiles. FIG. 1 is a flow chart diagram of an exemplary method 100 for generating graph-line maps of vehicular routes. The exemplary method 100 begins at 102 and involves obtaining a plurality of positioning data that marks traces of vehicular travel, at 104. In one embodiment, the positioning data comprises global positioning satellite (GPS) data that traces automobiles traveling on roadways. In this embodiment, for example, GPS tracking devices can be installed on a plurality of vehicles that regularly travel on roadways, such as taxis, delivery vehicles, buses, public services vehicles, and other public and private vehicles.

Figure 2:
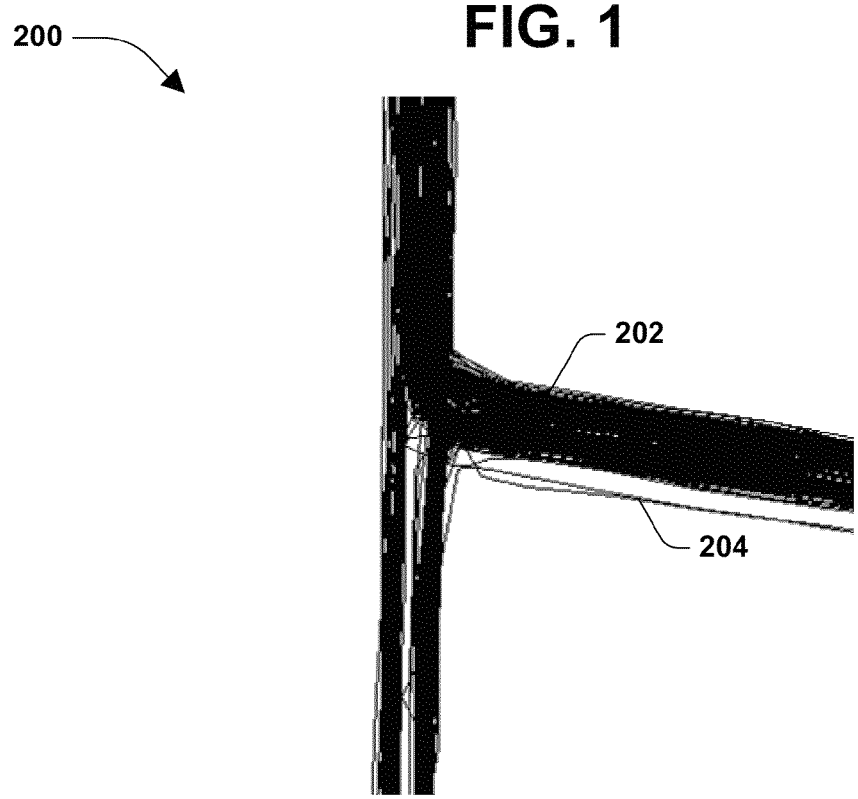
FIG. 2 is an illustration of exemplary travel route segment showing a plurality of traces.

In one embodiment the data is collected and compiled into a plurality of traces of vehicular traffic, such as shown in the illustration 200 of FIG. 2. The exemplary illustration of traces 200 shows a plurality of traces that represent a plurality of automobiles traveling over a segment of roadway. 202 represents a large number of traces traveling over a same section of the road in a same general location; whereas 204 shows some individual traces that represents vehicles that may have traveled over a portion of the road that is not commonly used.

Returning to FIG. 1, at 106, a location of a trace is clarified using adjustment forces that are related to the trace. As seen in FIG. 2, the traces 202 and 204 appear to cover a multitude of travel location for vehicles that provide the positioning data. The variety of trace location can be attributed to many factors, such as GPS data error, signal noise, interference, automobiles traveling in an irregular pattern, etc. In one embodiment, in order to provide for a more accurate vehicular route, such as a digital map, the traces can be clarified to identify a more accurate location for the traces, and help account for some of the potential errors attributed to the traces.

Figure 3:
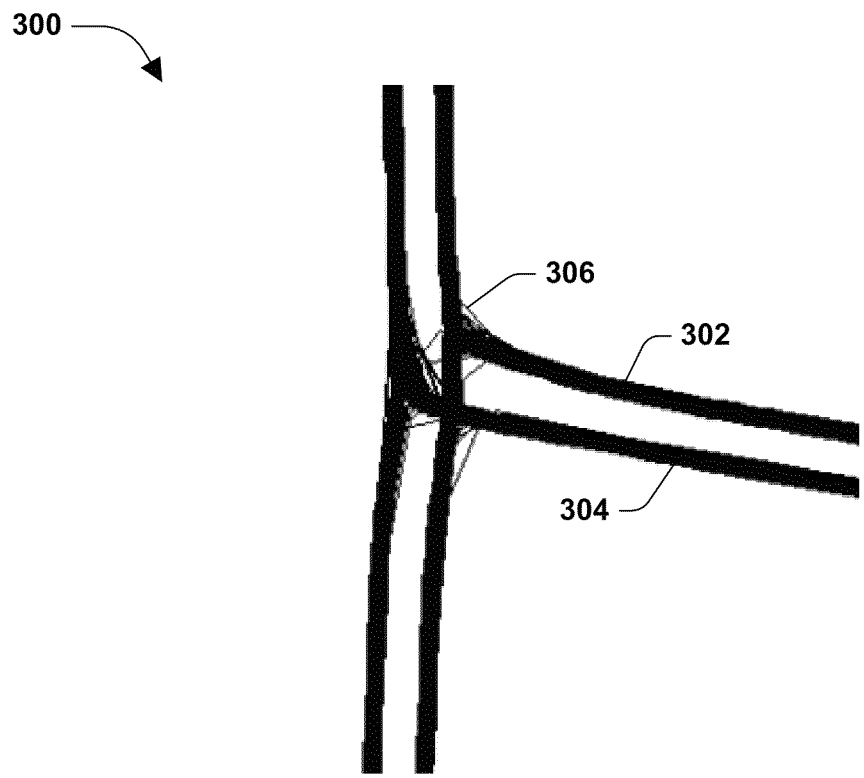
FIG. 3 is an illustration of exemplary vehicle travel segment where traces have been clarified using adjustment forces.

A trace can comprise a plurality of location nodes, such as location data points from GPS data, and a plurality of edges between the respective nodes. In this way, for example, a trace can be formed by drawing a line between a series of points marking where a vehicle has traveled. Adjustment forces related to the trace can be used to clarify a location for the trace, for example, adjusting the locations to form more accurate routes. FIG. 3 is an illustration 300 of exemplary vehicle travel segment where traces have been clarified using adjustment forces. In this illustration 300, the traces have been separated into lanes traveling in opposite directions 302 and 304, for example, as on a highway or freeway. Further, the traces have been grouped together to further define lane and roadway locations traveled by the traced vehicles. Some traces, such as 306, may remain outside some of the main group of traces grouped together. In one embodiment, these traces can be removed after the clarification process.

Figure 4:
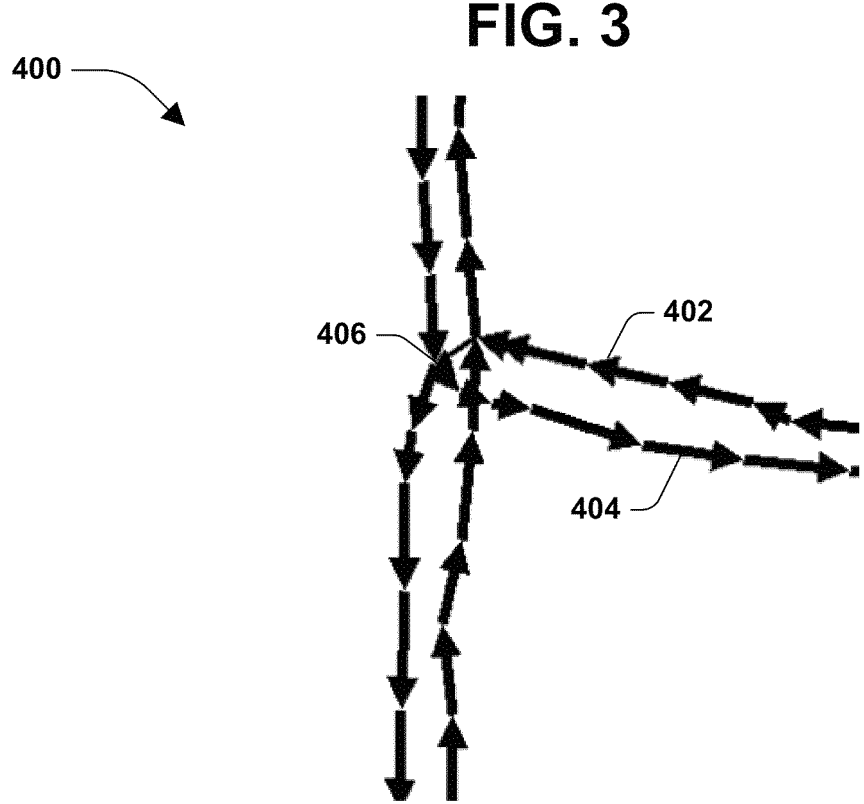
FIG. 4 is an illustration of an exemplary segment of a roadway where clarified traces have been merged into graph lines.

Returning to FIG. 1, at 108, related traces are merged into a graph line. In one embodiment, the traces that are grouped together, such as 302 in FIG. 3, are merged into a single graph line, which may represent a roadway for vehicle travel, for example. FIG. 4 is an illustration 400 of a segment of a roadway where clarified traces that are related have been merged into graph lines. In this example, the graph line 402 and 404 can represent opposite lanes of a roadway, where vehicles travel in opposite directions. In this example, the groups of related traces, such as 302 and 304 in FIG. 3, were merged into the respective graph lines 402 and 404. Further, an intersection 406 of graph lines can be created where the graph lines come together. In one embodiment, the intersection 406 may represent a point from/to which vehicle travel calculations can be determined (e.g., when determining a travel route, time, distance, etc. from an electronic map).

In one embodiment, time-related data may be obtained for respective positioning data (e.g., GPS data points), represented by nodes of a trace. This time-related data may be utilized to identify directionality for the nodes and related portions of the trace. For example, where respective nodes are collected at subsequent times, the times may be used to identify a direction in which the vehicle was traveling when collecting GPS data points.

Having merged the related traces into a graph line, the exemplary method 100 ends at 106.

Figure 5:
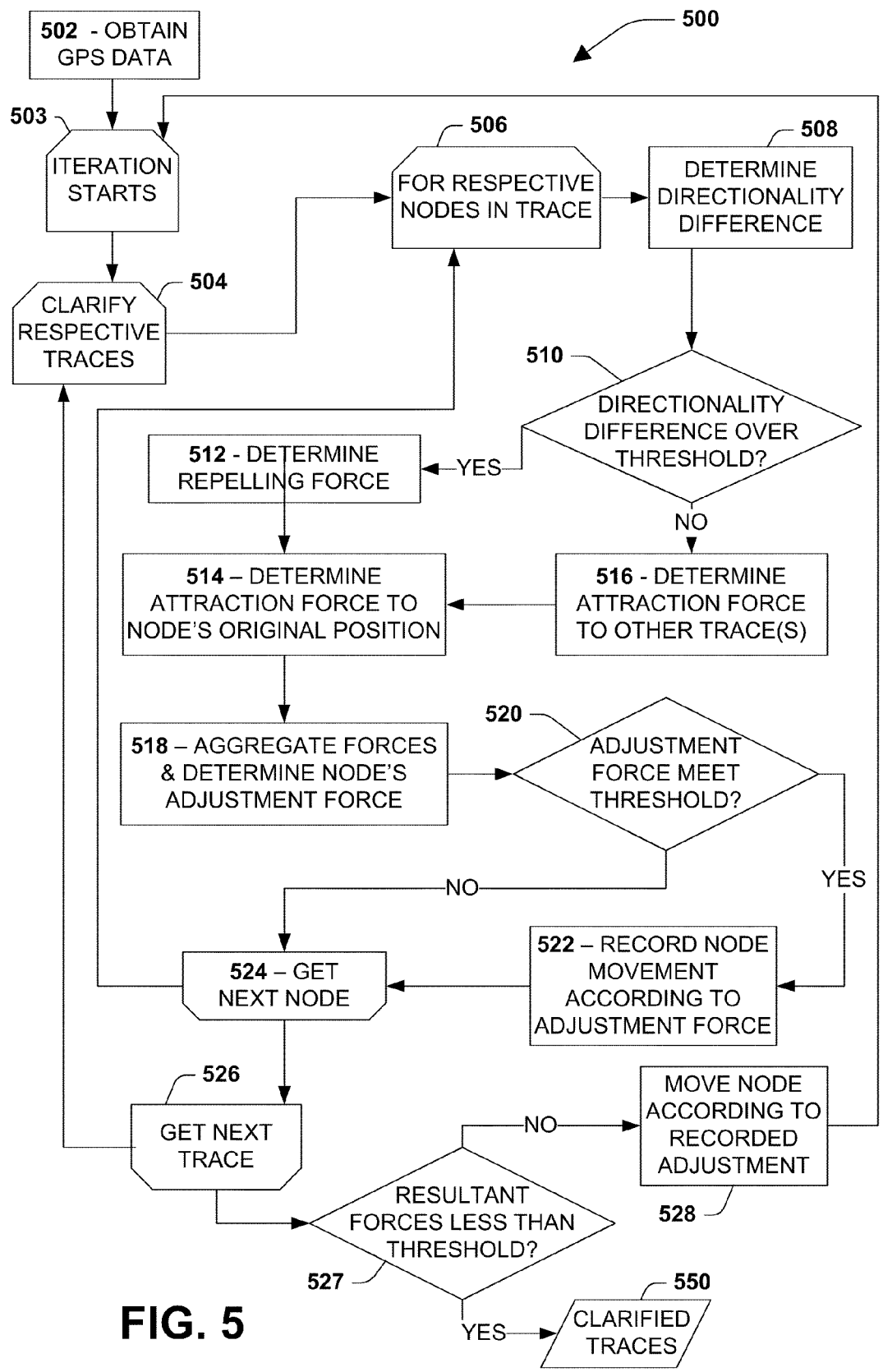
FIG. 5 is a flow chart illustrating one exemplary embodiment for clarifying traces.

FIG. 5 is a flow chart illustrating one exemplary embodiment 500 for clarifying traces. At 502, GPS data is obtained, for example, that can identify a plurality of vehicular travel traces from automobiles that have been outfitted with GPS tracking devices. At 503, respective iterations are initiated and at 504, a clarification loop begins for the respective traces. Further, at 506, a loop begins that potentially applies adjustment forces to respective nodes.

In this embodiment 500, at 508, a directionality difference is determined for the node between respective one or more neighboring traces. For example, the traces 202 in FIG. 2 appear to be closely grouped together. Because we can determine a direction of a trace by the time-related information associated with respective trace-nodes, as described above, a difference in direction can be determined for the node in question when compared with neighboring traces.

At 510, in FIG. 5, it is determined whether the directionality adjustment force is over a threshold. In one embodiment, a function of the directionality of the node in question can be compared with a function of the directionality of a segment of the neighboring trace. For example, the directionality of the node in question and the trace segment in question may comprise a directional value in degrees (of a compass). In one embodiment, the cosine of the two directional values may be calculated (e.g., $\cos(\text{dir}_{node}, \text{dir}_{seg})$), and a value less than one may represent a repelling force, and greater than one an attracting force.

For example, if $\text{dir}_{node}$ and $\text{dir}_{seg}$ have opposite directions, the cosine value will be less than one (e.g., over the threshold), and the directionality adjustment force will be a repelling force. Further, if $\text{dir}_{node}$ and $\text{dir}_{seg}$ have common directions, the cosine value will be greater than one (e.g., under the threshold), and the directionality adjustment force will be an attraction force. Additionally, if $\text{dir}_{node}$ and $\text{dir}_{seg}$ have orthogonal directions, the directionality adjustment force will be zero.

At 512, where the directionality difference is over the threshold, a magnitude of the repelling force can be determined between the node and the respective one or more neighboring traces. For example, a smaller cosine value from the calculations above may indicate a greater repelling force for the node away from the trace segment. However, at 516, if the directionality is under the threshold, a magnitude of an attraction force can be determined between the node and the respective one or more neighboring traces. For example, a larger cosine value from the above calculations may indicate a greater attraction force for the node to the trace segment.

Figure 6:
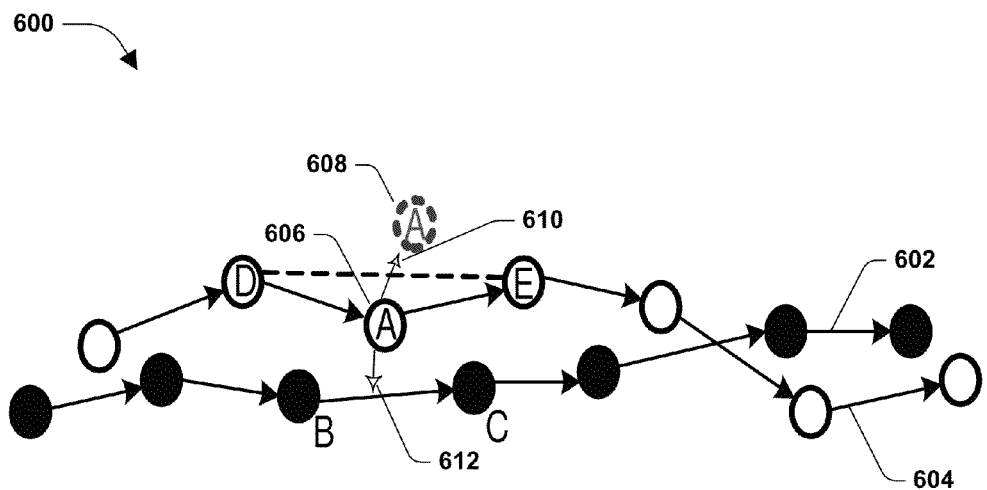
FIG. 6 is an illustration of exemplary trace segments where clarification can be performed.

At 514, an attraction force can be determined for the node to its original position (e.g., from a possible position to where it is moved due to the attraction force to a neighboring trace). As an example, the exemplary embodiment 600, in FIG. 6, illustrates two traces 602 and 604 with common directionality (e.g., heading from left to right across the illustration). Node A in the trace 604 may have been moved toward the trace 602 due to an attraction force 612 toward the trace 602 (e.g., based on the common direction of the two traces) to its current location 606. However, an attraction force 610 to node A's original position 608 may adjust a position of the node back toward the original position 608. In this way, for example, a balance may be struck between a type of gravitational force 612 pulling the node 606 toward a neighbor 602 and a type of springy force 610 that pulls the node 606 back to its original position 608.

In another embodiment, the magnitude of the adjustment forces for a node may be determined by utilizing closed form equations to predict outcomes using different parameters. For example, where one may wish traces to coalesce and separate when roadways are separate, closed form equations can be written to account for these idealized scenarios. In this way, in this example, a variety of parameters can be input and adjusted to predict what would occur in a variety of situations. Further, these simple scenarios can be used to see what may happen, for example, and then applied to real-world data. In other words, one may test a variety of parameters without using real-world data, to determine appropriate adjustment force magnitudes.

Figure 7:
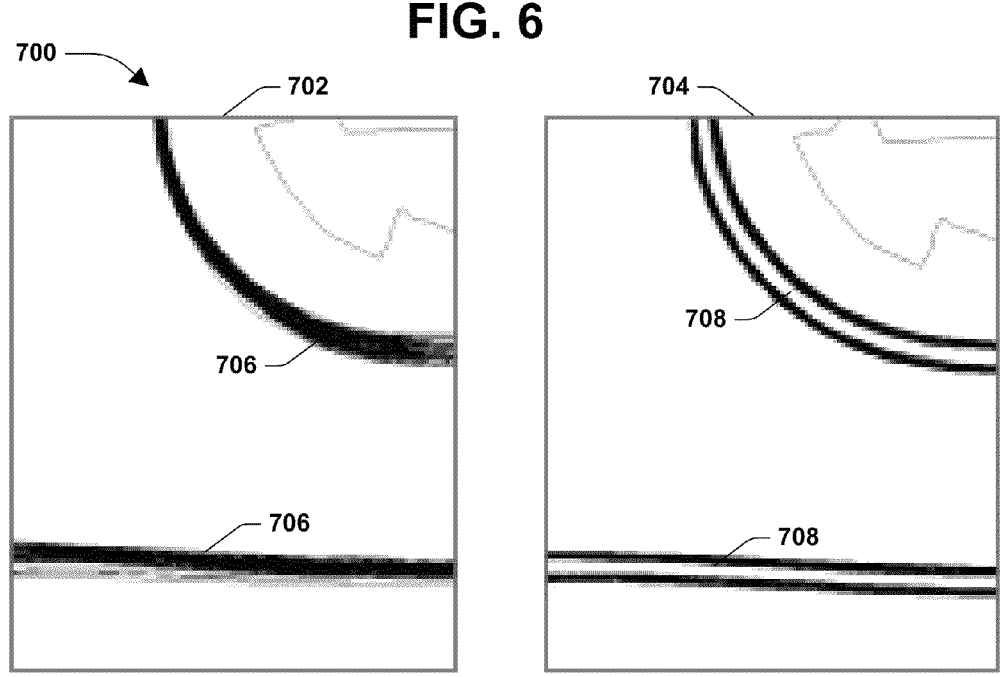
FIG. 7 is an illustration of an exemplary segment of a roadway where directionality forces may be applied.

Returning to FIG. 5, at 518, the adjustment forces for the node can be aggregated. For example, the repelling force, and/or attraction forces (e.g., to a neighboring trace and to the node's original position) can be aggregated for the node for the respective one or more neighboring traces. If the aggregated adjustment forces meet a threshold, at 520, the node can be moved to a location in accordance with the magnitude of the aggregated adjustment forces, at 522. For example, in FIG. 6, where the node A has a same directionality as the neighboring trace 602, the aggregated adjustment forces may comprise merely the two attraction forces, which allow for node A to be moved to a new position 606. However, if the node in question has a neighboring trace with an opposite directionality, after the aggregation the node may be moved away from the neighboring traces, as seen in the illustration 700 of FIG. 7.

In this example, the traces 706 before clarification 702 are close together. However, because some of the traces have opposing directionality, in this embodiment, the nodes of a trace are repelled away, forming two distinct lanes of traces 708 after clarification 704. Further, those traces that have common directionality are attracted closer to each other after clarification 704 to form more distinct lane patterns for a roadway, for example.

At 524, in FIG. 5, after the node has been moved according to the adjustment forces, or if the aggregated adjustment forces do not meet the threshold for being moved, a next node from the trace is retrieved and sent through the loop at 506. Further, at 526, when respective nodes in a trace have been subjected to clarification, a next trace is retrieved and sent through the clarification loop at 504. At 527, a determination is made regarding whether resultant forces are less than some (predetermined) threshold. If not, the method advances to 528 where the respective nodes can be moved to the locations recorded at 522, and the method then loops back to 503 for another iteration. If the resultant forces are less than the threshold, the method advances to 550 for clarified traces. That is, a result of the clarification of the respective traces is a plurality of clarified traces 550, such as those represented in FIGS. 3 and 7.

I will be appreciated that, while the above embodiments describe aggregating adjustment forces for the respective traces (e.g., per node), the techniques and systems described herein are not limited to these embodiments. It is anticipated that those skilled in the art may devise alternate ways to combine or utilize a variety of adjustment forces to clarify the traces. For example, one may attempt to balance attraction forces between a nodes original position and a neighboring trace by incrementally moving the node toward the trace and calculating whether the forces are balanced between each other. Further, after balancing attraction forces, one may determine whether a repelling force may be necessary to move traces apart based on directionality differences.

Figure 8:
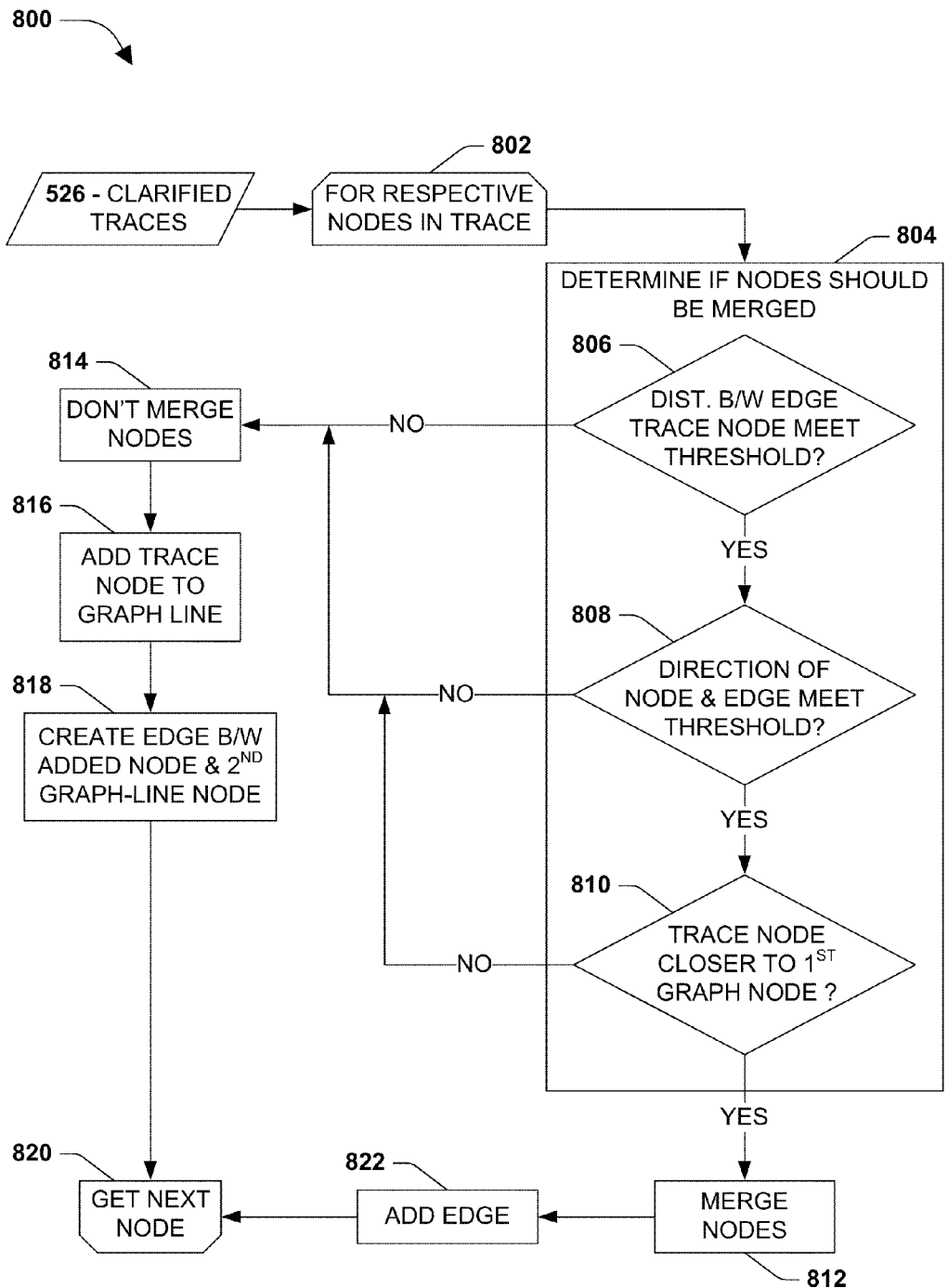
FIG. 8 is a flow chart illustrating an exemplary embodiment where clarified traces are merged into a graph line.

FIG. 8 is a flow chart illustrating an exemplary embodiment 800 where clarified traces are merged into a graph line. Initially, a graph line comprises no nodes or edges, and the clarified traces 526 can be used to create develop the graph line into a plurality of nodes and edges between nodes, for example, that may represent a vehicular traffic route. At 802, a trace merging loop begins for respective nodes in a trace.

At 804, it is determined whether the trace node in question should be merged into the graph line, for example, by merging with an existing graph-line node. Initially, when the graph line comprises no nodes or edges, the respective determinations at 806, 808, and 810 will result in a negative. Therefore, at 814, the trace-node is not merged with a graph-line node, as there is not one present. The trace node is added to the graph line, at 816, and because it is a first node added to the graph line, no edge will be added at 818. At 820, a next trace node is retrieved for the trace and run through the merging loop, at 802.

When a second trace node is considered, it will also be added to the graph line (not merged), as it will not meet the criteria in 804. Therefore, in one embodiment, a first trace that is run through the graph line merging procedure may result in the trace (or trace segment) being merged into the graph line. FIGS. 9A-D illustrate an exemplary embodiment of a stepped process for merging several traces into a graph line representation. In FIG. 9A, the illustration 900 comprises three individual traces 902, 904, and 906. The initial graph line is empty, for example, so after trace 902 is merged it becomes the initial representation of the graph line 922, at 920 of FIG. 9B.

Figure 9B:
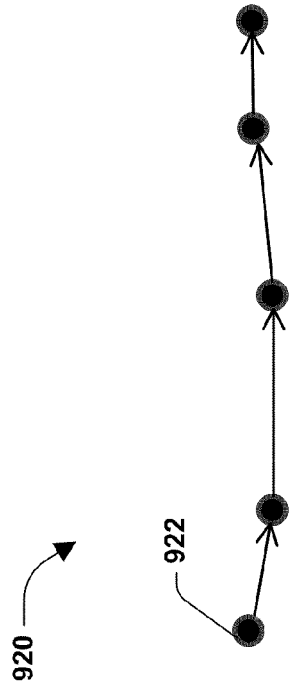
FIGS. 9A-D illustrate an exemplary embodiment of a stepped process for merging several traces into a graph line representation.

After a graph line has been generated, as in FIG. 9B, 920, a second trace can be run through the merging loop at 802, where a first trace node is selected. At 804, it can be determined whether the trace node should be merged with a graph-line node that is already part of the graph line. Intuitively, a trace node should be merged with a graph-line node when the two nodes are from a same roadway segment, for example. In this embodiment, to determine whether the nodes are from the same roadway segment, at 806, a distance between the trace node and an edge in the graph line is determined to meet a desired node-edge distance threshold value.

For example, if an edge is present in the graph line (e.g., the graph line for the comparative trace segment is not empty), the distance between the trace node and a closest edge can be measured and compared to the threshold. In one embodiment, the threshold can be a value generated from the closed equation testing described above, that yields desired merging results. If the distance does not meet the threshold, the nodes are not merged. However, at 808, if the distance meets the threshold, a difference in directionality of the trace node and the edge can be identified and determined whether it meets a desired directionality threshold.

As described above, a directionality for the node and the graph-line edge can be determined. Further, a difference between the two directionalities can be determined (e.g., using a cosine calculation as described above). The difference value can be compared against a desired directionality threshold to determine, such as determined by testing. If the directionality difference meets the threshold, at 810, it can be determined whether the trace node is closer to a first graph-line node than a second graph-line node, that comprise the ends of the graph-line edge.

For example, where $g_1$ and $g_2$ are two graph-line nodes and e is the edge between $g_1$ and $g_2$, it can be determined whether the trace node is closer to $g_1$ than to $g_2$. At 812, if the trace node is closer to the first graph-line node, the trace node can be merged into the first graph-line node, in the graph. Further, at 822, an edge can be added between the merged node and the second graph-line node, if one is present.

Figure 9D:
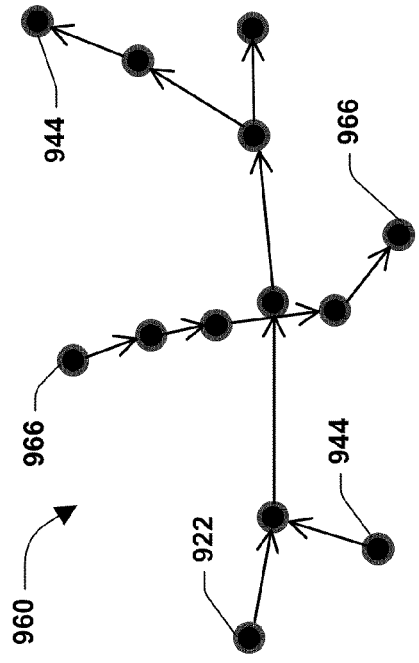
Figure 9A:
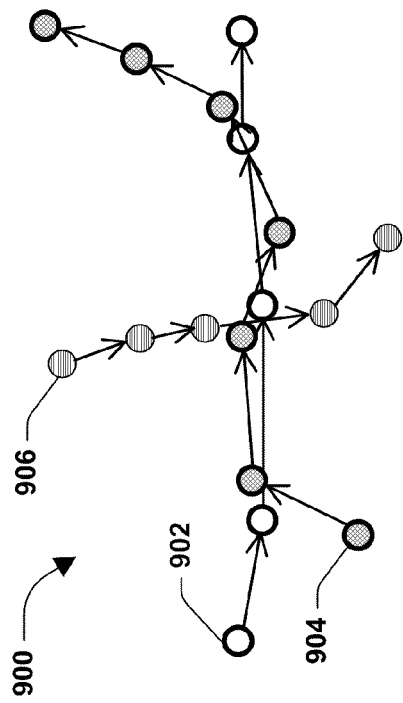
Figure 9C:
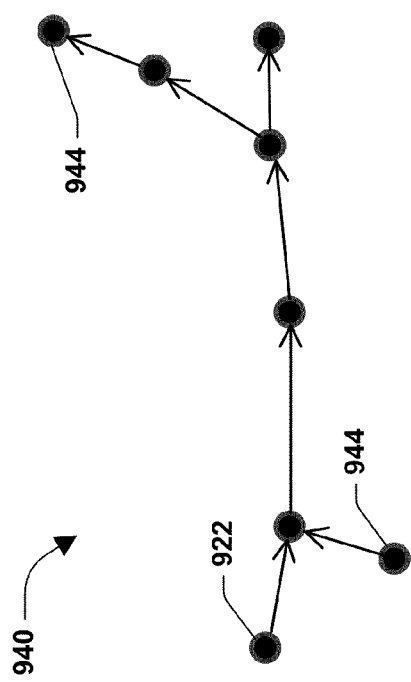

FIG. 9C at 940 illustrates how the graph line 922 may look after the second node from trace 904, in 900, is merged into the second graph-line node of the graph line 922, at 940. Further, the third and fourth trace nodes of 904, at 900, have been merged into the third graph-line node of the graph line 922, at 940. Additionally, the fifth trace node of 904, at 900, has been merged into the fourth graph-line node of the graph line 922, at 940.

However, in FIG. 8, if any of the determinations for node merging 806, 808, 810, return in the negative, the trace node and the graph-line node are not merged, at 814. At 816, the trace node is added to the graph line, for example, FIGS. 9C and 9D, at 940 and 960, illustrate nodes that are added to the graph line, and not merged with existing graph-line nodes, such as 944 and 966. In these examples, the trace nodes may not be added because they do not meet a distance to the edge threshold, such as those in 944. Further, in this example, the trace nodes may not be added because they do not meet a directionality threshold, such as those in 966.

At 818, when a trace node is added to the graph line, such as 944 in FIG. 9C, an edge is added between the added trace node and the second graph-line node, if the second graph-line node is present. In this way, for example, a new route can be developed for the graph line, as shown in FIGS. 9C and 9D, at 944 and 966. After the edge is added between the nodes, a next node for the trace is retrieved, at 820.

In one embodiment, by merging a trace node n to a graph-line node $g_1$, no new nodes are created for the graph line. However, it may be desirable to record connectivity information for the trace in the graph line. In this embodiment, a variable that indicates a previous node (prevNode) can be utilized by an algorithm that performs graph-line merging. This variable can be the graph-line node $g_2$ that the previous trace node n maps to. To record connectivity information, the graph-line node $g_1$ should be reachable from prevNode in a desired number of hops (e.g., hops between nodes). In this embodiment, if the graph line does not reflect this information, we can add a new edge from prevNode to $g_1$ in the graph.

In one aspect, there may be random outlier traces that result from errors, such as GPS signal errors, driving errors, or other potential recording errors. These trace segments typically will map to graph edges that have a small trace volume (e.g., one trace forms the graph-line). Further, road segments that are traveled merely a few times will also typically be mapped to graph edges having a small trace volume (e.g., one to three traces form the graph-line). In this aspect, for example, these graph-line segments may be considered "unreliable" when they have a low trace volume forming the graph line. In one embodiment merging related traces into a graph line can comprise removing edges from the graph line that have a number of traces that meets a desired trace volume threshold. In this embodiment, for example, the desired trace volume threshold may be three traces, which typically provides a more reliable graph-line.

Figure 10:
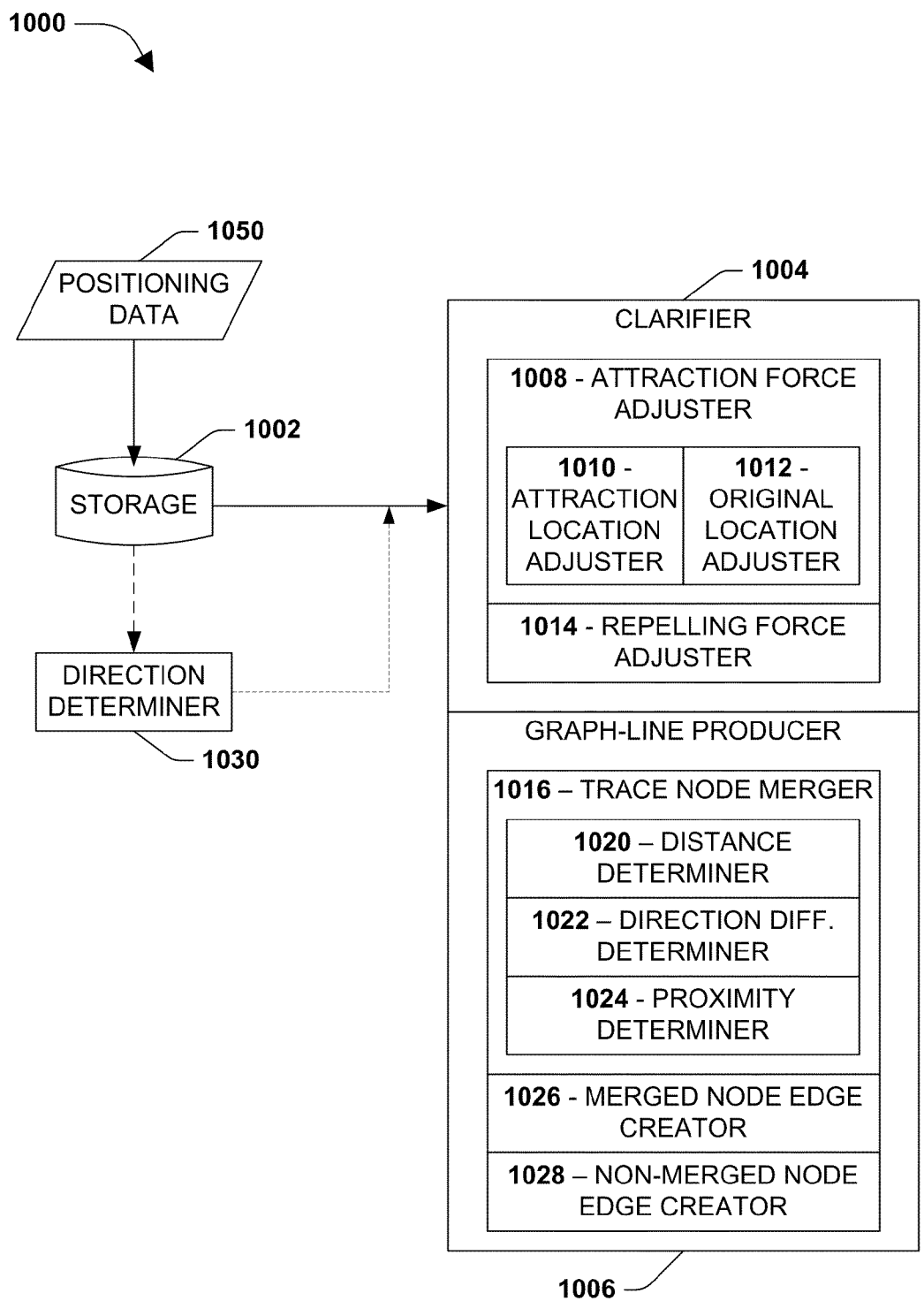
FIG. 10 is a component block illustrating an exemplary system for generating graph-line maps of vehicular routes.

A system may be devised that can generate a graph line, which may be used to designate vehicular travel routing, such as for mapping purposes. FIG. 10 is a component block diagram of an exemplary system 1000 for generating graph-line maps of vehicular routes. The exemplary system comprises a data storage component 1002 that is configured to store a plurality of positioning data that mark traces of vehicular travel. In one embodiment, the positioning data can be GPS tracking points retrieved from vehicles and stored on the data storage component 1002.

The data storage component 1002 is operably coupled to a clarification component 1004, which is configured to adjust a location of a trace using adjustment forces related to the trace. In one embodiment, positioning data points stored on the data storage component 1002 can be nodes of a trace that trace a path of vehicular travel. The clarification component 1004 can be used to clarify a position of respective traces, for example, to account for potential errors and/or a plurality of traces occupying a similar location. Further, for example, the clarification component 1004 can be used separate traces that represent vehicles traveling in different directions, such as in opposite directions on a highway.

The exemplary system 1000 further comprises a graph line producing component configured to merge related traces into a graph line. For example, where a plurality of traces comprise a related area of a roadway, the traces can be merged to form a graph line that represents that roadway. Further, segments of traces that run in a direction along one side of a highway can be merged into a graph line, and segments of traces that run in another direction along another side of the highway can be merged into another graph line.

In one embodiment, the system can comprise a direction determiner component 1030, which can be configured to identify directionality for segments of a trace and related nodes using time-related data from the nodes of the trace. For example, positioning data 1050 stored in the data storage component 1002 can comprise GPS data points collected from vehicles traveling along a roadway. GPS data points can comprise time stamps that identify when the GPS point was collected, which can identify a direction the vehicle traveled. In one embodiment, the time related data can identify the direction of the traces that is comprised of the time stamped nodes.

In one embodiment, the clarification component 1004 comprises an attraction force adjustment component 1008 that is configured to shift the location of the trace until a net force for the trace is balanced. In this embodiment, an attraction location adjuster 1010 is configured to determine a first attraction force that shifts the location of the trace to an attraction location, and an original location adjuster 1012 is configured to determine a second attraction force that shifts the location of the trace, which is shifted by the attraction location adjuster's 1010 determination, to its original position. As an example, the node can be incrementally shifted toward a trace and the attraction force adjustment component 1008 can determine whether the newly shifted location has a balanced net force (e.g., between forces from the attraction location adjuster 1010 an original location adjuster 1012).

In another embodiment, the clarification component 1004 can comprise a repelling force adjustment component 1014 that is configured to shift a first trace away from a second trace, where the second trace has different directionality than that of the first trace. As described above, for example, where traces that are in a same general location but come from vehicles traveling in opposite directions, the repelling force adjustment component 1014 can separate the traces.

In another embodiment, the graph line producing component 1006 comprises a trace node merging component 1016, which can be configured to determine whether a trace node should be merged with a first graph-line node. Further, in this embodiment, a merged node edge creation component 1026 is configured to create an edge between the merged first graph-line node and a second graph-line node, if the second graph-line node is present and an edge between the nodes is not present, when the trace node is merged with a first graph-line node. Additionally, a non-merged node edge creation component can be configured to add the trace node to the graph line, and create an edge between the added trace node and the second graph-line node if the second graph-line node is present.

Further, in one embodiment, the trace node merging component 1016 comprises a distance determination component 1020 configured to determine if a distance between the trace node and an edge between the first graph-line node and the second graph-line node meets a desired threshold. A direction difference determination component 1022 can be configured to determine if a difference in directionality of the trace node and the edge meets a desired threshold, and a proximity determination component 1024 can be configured to determine if the trace node is closer to the first graph-line node than the second graph-line node.

Figure 11:
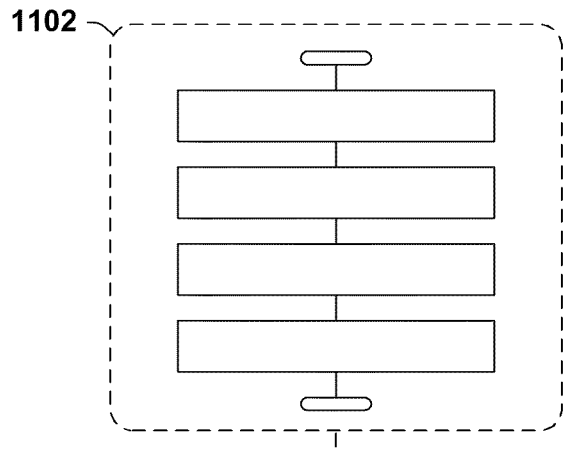
FIG. 11 is an illustration of an exemplary computer-readable medium comprising processor-executable instructions configured to embody one or more of the provisions set forth herein.
Figure 11:
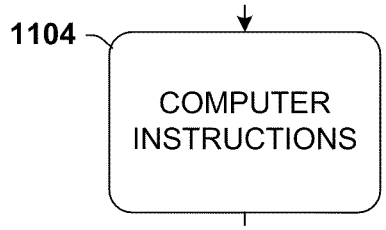
Figure 11:
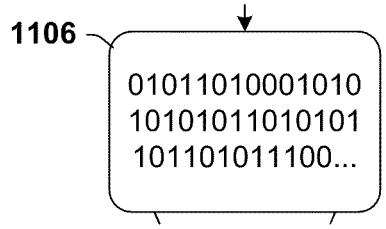
Figure 11:
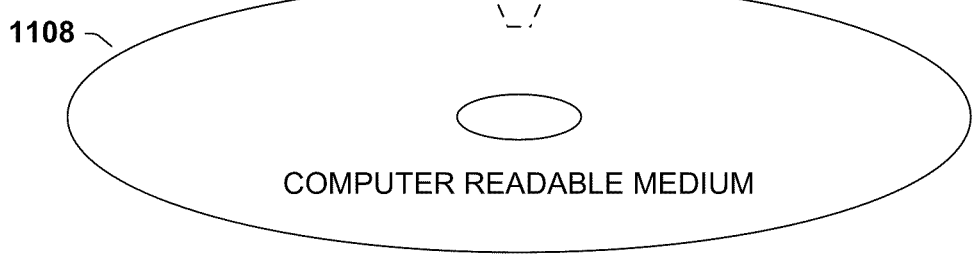

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1108 (e.g., a CD-R, DVD-R, or a platter of a hard disk drive), on which is encoded computer-readable data 1106. This computer-readable data 1106 in turn comprises a set of computer instructions 1104 configured to operate according to one or more of the principles set forth herein. In one such embodiment 1102, the processor-executable instructions 1104 may be configured to perform a method, such as the exemplary method 100 of FIG. 1, for example. In another such embodiment, the processor-executable instructions 1104 may be configured to implement a system, such as the exemplary system 1000 of FIG. 10, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
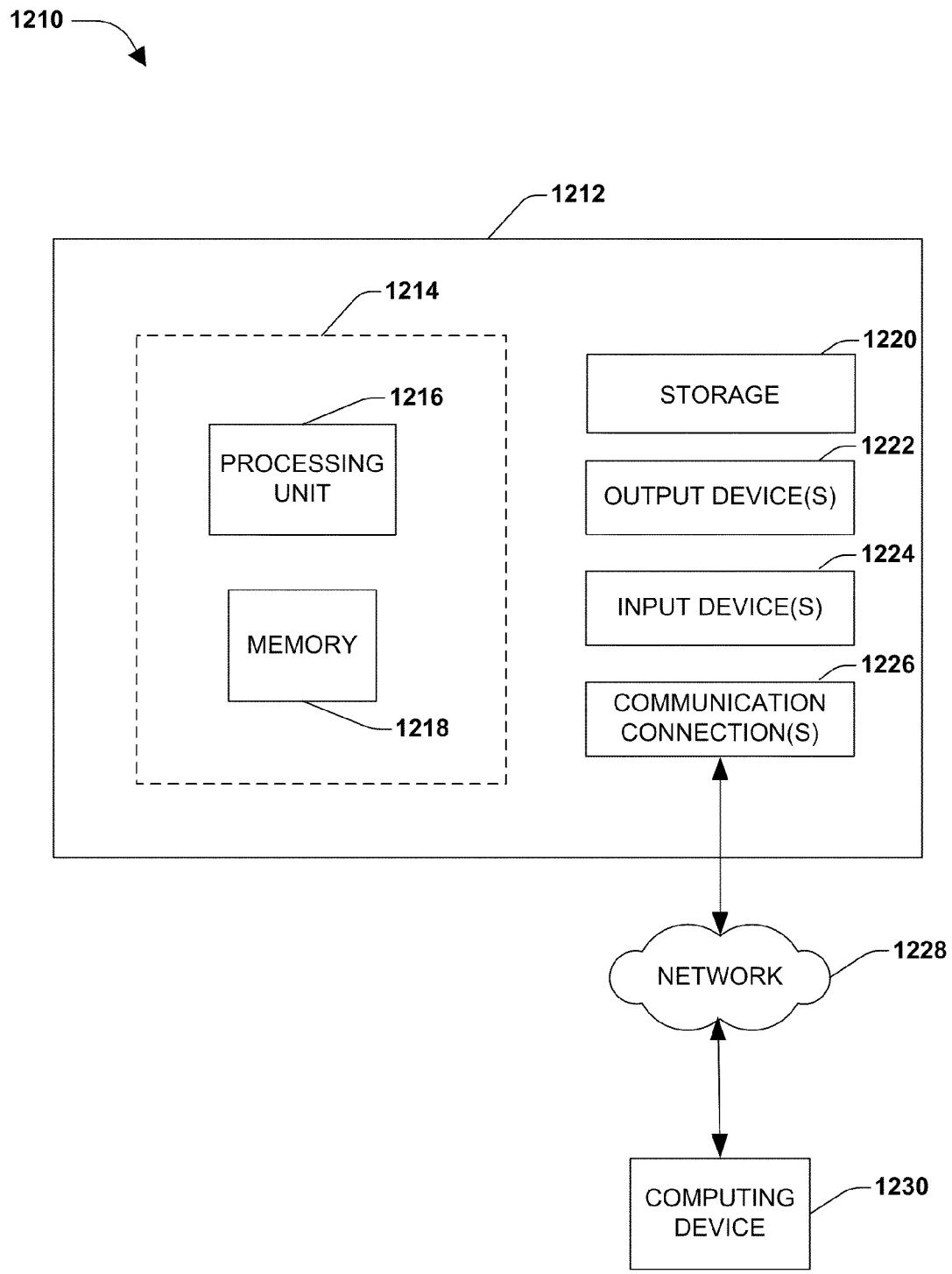
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit, comprising:
   receiving positioning data associated with a first vehicle, a second vehicle, a third vehicle, a fourth vehicle, a fifth vehicle and a sixth vehicle, the positioning data associated with one or more traces;
   receiving time-related data associated with the first vehicle, the second vehicle, the third vehicle, the fourth vehicle, the fifth vehicle and the sixth vehicle;
   determining one or more directionalities associated with at least one of the first vehicle, the second vehicle, the third vehicle, the fourth vehicle, the fifth vehicle or the sixth vehicle based at least in part on at least some of the positioning data and at least some of the time-related data;
   shifting a location of a trace of vehicular travel associated with the first vehicle based at least in part on:
      an attraction force between the trace and a second trace of vehicular travel associated with the second vehicle, the attraction force based at least in part on the second trace comprising a second directionality, of the one or more directionalities, that does not differ from a first directionality, of the one or more directionalities, of the trace in excess of a threshold, the first directionality represented by a first directional value corresponding to a first angle associated with the trace, the second directionality represented by a second directional value corresponding to a second angle associated with the second trace, where a cosine of the first directional value and the second directional value is greater than one; and
      a repelling force between the trace and a third trace of vehicular travel associated with the third vehicle, the repelling force based at least in part on the third trace comprising a third directionality, of the one or more directionalities, that does differ from the first directionality of the trace in excess of the threshold, the third directionality represented by a third directional value corresponding to a third angle associated with the third trace, where a cosine of the first directional value and the third directional value is less than one;
   shifting a second location of a fourth trace of vehicular travel associated with the fourth vehicle based at least in part on:

a second attraction force between the fourth trace and a fifth trace of vehicular travel associated with the fifth vehicle, the second attraction force based at least in part on the fifth trace comprising a fifth directionality, of the one or more directionalities, that does not differ from a fourth directionality, of the one or more directionalities, of the fourth trace in excess of a second threshold, the fourth directionality represented by a fourth directional value corresponding to a fourth angle associated with the fourth trace, the fifth directionality represented by a fifth directional value corresponding to a fifth angle associated with the fifth trace, where a cosine of the fourth directional value and the fifth directional value is greater than one; and a second repelling force between the fourth trace and a sixth trace of vehicular travel associated with the sixth vehicle, the second repelling force based at least in part on the sixth trace comprising a sixth directionality, of the one or more directionalities, that does differ from the fourth directionality of the fourth trace in excess of the second threshold, the sixth directionality represented by a sixth directional value corresponding to a sixth angle associated with the sixth angle, where a cosine of the fourth directional value and the sixth directional value is less than one; and merging the trace with one or more related traces into a graph-line based at least in part on the shifted location and merging the fourth trace with one or more second related traces into a second graph-line based at least in part on the shifted second location, the graph-line having a first direction on a roadway and the second graph-line having a second direction opposite the first direction on the roadway.

2. The method of claim 1, the trace comprising one or more location nodes and one or more edges between at least some of the one or more location nodes.

3. The method of claim 1, the positioning data comprising global positioning satellite (GPS) data.

4. The method of claim 1, at least one of the attraction force or the repelling force comprising an adjustment force.

5. The method of claim 1, comprising shifting the location of the trace based at least in part on a balance of a net force for the trace.

6. The method of claim 1, comprising determining a magnitude of the repelling force based at least in part on a function of least one of the first directionality of the trace or the third directionality of the third trace.

7. The method of claim 1, comprising determining a magnitude of the attraction force based at least in part on a function of at least one of the first directionality of the trace or the second directionality of the second trace.

8. The method of claim 1, comprising merging at least some of the one or more related traces based at least in part on a location associated with a graph-line node.

9. The method of claim 1, comprising determining a desired node-edge distance threshold based at least in part on a distance between a trace node and an edge between graph-line nodes.

10. The method of claim 1, comprising determining a proximity of a node based at least in part on a trace node, a first graph-line node, and a second graph-line node.

11. A system, comprising:
one or more processing units; and
memory comprising instructions that when executed by at least one of the one or more processing units, implement at least some of:
a component configured to:
receive positioning data associated with a first vehicle, a second vehicle and a third vehicle, the positioning data associated with one or more traces;
receive time-related data associated with the first vehicle, the second vehicle and the third vehicle; and
determine one or more directionalities associated with at least one of the first vehicle, the second vehicle or the third vehicle based at least in part on at least some of the positioning data and at least some of the time-related data;
a clarification component configured to:
shift a location of a trace of vehicular travel associated with the first vehicle based at least in part on a net force for the trace based at least in part on at least one of:
an attraction force between the trace and a second trace of vehicular travel associated with the second vehicle based at least in part on the second trace comprising a second directionality, of the one or more directionalities, similar to a first directionality, of the one or more directionalities, of the trace; or
a repelling force between the trace and a third trace of vehicular travel associated with the third vehicle based at least in part on the third trace comprising a third directionality, of the one or more directionalities, different than the first directionality of the trace; and
a graph-line component configured to merge the trace with one or more related traces into a graph-line based at least in part on the shifted location.

12. The system of claim 11, the trace comprising one or more location nodes and one or more edges between at least some of the one or more location nodes.

13. The system of claim 11, the positioning data comprising global positioning satellite (GPS) data.

14. The system of claim 11, at least one of the attraction force or the repelling force comprising an adjustment force.

15. The system of claim 11, the clarification component configured to shift the location of the trace based at least in part on a balance of a net force for the trace.

16. The system of claim 11, the graph-line component configured to determine a magnitude of the repelling force based at least in part on a function of at least one of the first directionality of the trace or the third directionality of the third trace.

17. A computer-readable storage medium, excluding signals, comprising computer-executable instructions, which when executed at least in part via a processing unit on a computer performs acts, comprising:
shifting a location of a trace of vehicular travel associated with a first vehicle based at least in part on at least one of:
an attraction force between the trace associated with the first vehicle and a second trace of vehicular travel associated with a second vehicle based at least in part on the second trace comprising a second directionality that does not differ from a first directionality of the trace in excess of a threshold, the first directionality represented by a first directional value corresponding to a first angle associated with the trace, the second directionality represented by a second directional value corresponding to a second angle associated with the second trace, where a cosine of the first directional value and the second directional value is greater than one; or a repelling force between the trace associated with the first vehicle and a third trace of vehicular travel associated with a third vehicle based at least in part on the third trace comprising a third directionality that does differ from the first directionality of the trace in excess of the threshold, the third directionality represented by a third directional value corresponding to a third angle associated with the third trace, where a cosine of the first directional value and the third directional value is less than one; and merging the trace with one or more related traces into a graph-line based at least in part on the shifted location.

18. The computer-readable storage medium of claim 17, the trace comprising one or more location nodes and one or more edges between at least some of the one or more location nodes, at least some of the one or more location nodes comprising one or more global positioning satellite (GPS) data points.

19. The computer-readable storage medium of claim 17, comprising identifying at least one of the first directionality of the trace, the second directionality of the second trace, or the third directionality of the third trace.

20. The computer-readable storage medium of claim 17, at least one of the attraction force or the repelling force comprising an adjustment force.

* * * * *